United States Patent [19]

Steenblik et al.

[11] Patent Number: 4,685,718
[45] Date of Patent: Aug. 11, 1987

[54] DEVICE FOR ATTACHING RAIN SHIELDS TO MOTOR VEHICLE WINDOWS

[75] Inventors: Richard A. Steenblik, Stone Mountain; Asa R. Phillips, Dunwoody; Daniel P. Mamay, Lilburn; Lawrence K. Denson; Richard A. Tucker, both of Smyrna; Jimmy M. Clark, Lawrenceville, all of Ga.

[73] Assignee: Liberty Specialties, Inc., Chamblee, Ga.

[21] Appl. No.: 8,047

[22] Filed: Jan. 21, 1987

Related U.S. Application Data

[63] Continuation of Ser. No. 871,757, Jun. 9, 1986, abandoned.

[51] Int. Cl.[4] ............................................. B60J 9/00
[52] U.S. Cl. .................................... 296/154; 296/93; 98/2.12
[58] Field of Search .................... 296/152, 154, 93; 98/2.13, 2.12

[56] References Cited

U.S. PATENT DOCUMENTS

| | | | |
|---|---|---|---|
| 2,134,054 | 10/1938 | Mably | 296/152 |
| 2,199,134 | 4/1940 | Johnson | 296/152 |
| 2,575,933 | 11/1951 | Thorne | 296/152 |
| 2,599,015 | 6/1952 | Pritchard | 296/152 |
| 2,799,529 | 7/1957 | Groboski | 296/154 |
| 3,294,439 | 12/1966 | Phillips, Jr. | 296/152 |
| 3,915,078 | 10/1975 | Woods, Jr. | 98/2.12 |
| 4,527,466 | 7/1985 | Kassar et al. | 296/152 |

OTHER PUBLICATIONS

Ventivisor Installation Instruction A, Jul. 1985.
Ventivisor Installation Instruction B, Jul. 1985.
Ventshade Installation Instruction, Oct. 1976.
Installation Instructions for Auto Ventshades, Oct. 1979.

*Primary Examiner*—Robert R. Song
*Attorney, Agent, or Firm*—Sutherland, Asbill & Brennan

[57] ABSTRACT

Some new truck and van weather seals have a cross-sectional shape like an inverted U, with inwardly upturned, flexible feet. These feet seal against the opposite sides of the window glass when the window is closed. Special retainer means are disclosed for holding rain shields in the upper horizontal casings of motor vehicle windows that are fitted with this type of resilient seal. The retainer means comprises a combination of (a) a substantially U-shaped plastic channel member that fits inside the seal, and which is held by the seal's upturned feet, and (b) a substantially U-shaped steel clip that is held inside the channel member, and which clamps and holds the top edge of the rain shield in the casing.

26 Claims, 12 Drawing Figures

DEVICE FOR ATTACHING RAIN SHIELDS TO MOTOR VEHICLE WINDOWS

This is a continuation of application Ser. No. 871,757 filed June 9, 1986, now abandoned.

This invention relates to removable rain shields that are mounted on the outside of motor vehicle windows. More particularly, it concerns a device for holding rain shields in the casings of certain newer model automobiles, trucks, and vans.

Motor vehicle rain shields are automotive accessories that are installed outside the openable side windows in a car, truck, or van, along the top edge of the window. They overhang the space above the window glass when it is partially lowered. The shield deflects rain from entering the passenger compartment; this allows for better air circulation without getting the passengers or the interior of the vehicle wet.

Rain shields that are sold for the motor vehicle aftermarket normally have a top edge that is inserted in the window casing and held there by a plurality of retainer clips. The window casing typically is lined with a strip of rubber weather seal that is pressure fitted into the casing. In most automobiles, trucks, and vans this weather seal strip can be temporarily pulled out of the casing and the retainer clip for the rain shield can be inserted behind the strip. See, for example, U.S. Pat. No. 3,294,439. In some of the recent model trucks and vans, however, the seal wraps around the outside of the casing, making it necessary to slit a hole in the seal to allow the retainer clip to stick through. Also, in some vehicles the weather seal is bonded to the casing and cannot readily be extracted so as to insert a retainer clip behind it. Some better means are needed for installing and retaining rain shields in automotive window casings of either type.

Some of the new weather seals have a cross-sectional shape like an inverted U, with inwardly upturned, flexible feet. These feet seal against the opposite sides of the window glass when the window is closed. We have invented special retainer means for holding rain shields in the upper horizontal casings of motor vehicle windows that are fitted with this type of resilient seal. Our retainer means comprises a combination of (a) a substantially U-shaped channel member that fits inside the seal, and which is held by the seal's upturned feet, and (b) a substantially U-shaped clip that is held inside the channel member, and which clamps and holds the top edge of the rain shield in the casing.

The U-shaped channel member has a ceiling, an inside wall ending in a bottom edge, and an opposite, outside wall also ending in a bottom edge. The "inside wall" of the channel member refers to the wall toward the inside of the automobile when the channel member is installed in the window casing. The channel member is of a size to be insertable, ceiling-first, in the upper horizontal casing of the automobile window, so that the channel member's bottom edges are tucked behind the respective upturned feet of the seal. The upturned feet hold the channel member and keep it from falling out of the casing. It is also desirable that the channel member be wide enough that its walls will press against the sides of the casing, to help keep it in place.

The interior surface of the outside wall of the channel member has at least one longitudinal ledge section, the purpose of which will be discussed in the following paragraphs.

The clip has a ceiling, an inside wall ending in a bottom edge, and an outside wall also ending in a bottom edge. The clip is of a size to be insertable, ceiling-first, in the channel member. Again, the "inside wall" refers to the wall of the clip that is towards the interior of the automobile. The bottom edge of the clip's outside wall is bent outwardly and upwardly, so as to be capable of gripping the top edge of the rain shield between the outside wall and the adjacent upturned foot of the resilient seal.

To prevent the clip from falling out of the window casing, its outside wall also has an outwardly projecting barb member that is adapted to hook on the interior ledge section on the channel member's outside wall. In a preferred embodiment, each wall of the channel member has at least one longitudinal ledge section on its interior surface and the inside wall of the clip also hooks onto the inside wall ledge of the channel member. This can be accomplished in either of two ways. Either the inside wall of the clip can have an outwardly projecting barb member, like the opposite wall has, or the clip's inside wall can be short, ending in a bottom edge that is adapted to rest on the interior ledge on the channel member's inside wall.

In an optional embodiment, the interior surface of each of the walls of the channel member may have at least two longitudinal ledge sections which are parallel and spaced apart. This makes the retainer means more adaptable in case a variation in dimensions prevents the clip from being fully inserted in the channel member. If the clip cannot be inserted far enough to hook on the upper ledge, it still might be able to reach and hook on the lower ledge.

The channel member preferably is made of extruded plastic, e.g., polyvinyl chloride or polycarbonate, and preferably has a length of about ½ to 2½ inches.

The clip preferably is made of spring steel. Also, the clip, when in its relaxed position, preferably is wider from wall to wall than the inside width of the channel member. Thus the clip is partially compressed when inserted in the channel member. This causes the clip's outside wall to exert a clamping pressure against the top edge of the rain shield, helping to hold it in place.

The present invention will work with any rain shield that has a top edge that is thin enough to fit inside the window's upper horizontal casing when the window is closed.

The invention will be better understood by considering the accompanying drawings. Referring to those drawings, FIG. 1 is an environmental perspective view showing the window on the driver's side of a pickup truck fitted with a removable rain shield of the type to which the present invention is directed.

Figures 4, 5, 6, 7, 8:
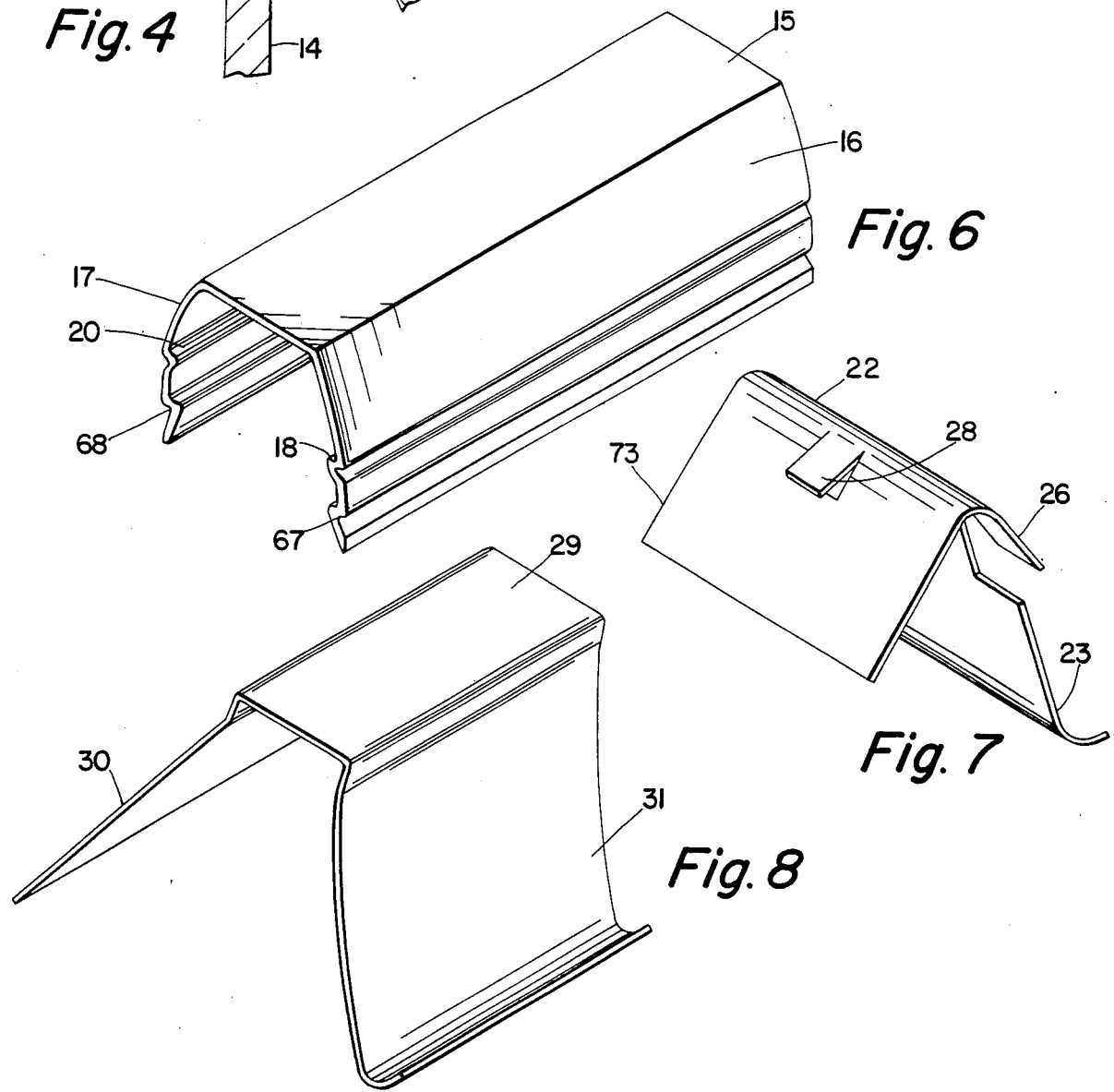
FIG. 4 is a cross-section on the line 4—4 of FIG. 1, showing one set of the retainer means of FIG. 3, holding the top edge of the rain shield in place.
FIG. 5 is a cross-section on the line 5—5 of FIG. 1, showing different retainer means for holding the side edge of the rain shield in the vertical casing of the automobile window.
FIG. 6 is a perspective view of the channel member shown in FIGS. 3 and 4.
FIG. 7 is a perspective view of the clip shown in FIGS. 3 and 4.
FIG. 8 is a perspective view of the retainer clip shown in FIG. 5.

Referring to FIGS. 4 and 5, rubber weather seal 10 is pressure fitted inside steel window casing 11. (For clarity's sake, in FIGS. 4 and 5 the parts are shown spaced apart, rather than touching, as they would be in actual use.) Seal 10 has inwardly upturned feet 12 and 13 that seal against the opposite sides of window 14 when it is closed, except in the spaces where the seal is interrputed by outside wall 23 of clip 22 (FIG. 4) or outside wall 31 of clip 29 (FIG. 5).

Plastic channel member 15 is wedged inside seal 10 (FIG. 4). The bottom edge of the outside wall 16 of channel member 15 is tucked behind upturned foot 13 of seal 10. Simiarly, the bottom edge of inside wall 17 of channel member 15 is tucked behind upturned foot 12 of seal 10. Channel member 15 is approximately two inches long. Outside wall 16 of channel member 15 has a longitudinal ledge 18 formed in its interior surface. Similarly, longitudinal ledge 20 is formed in the interior surface of inside wall 17.

Outside leg 19 of seal 10 widens at its base 21, apparently to strengthen the seal at this point of flexure, which is exposed to the sun and weather. A dog-leg bend 67 is provided in wall 16 of channel member 15 to provide a close fit against protruding base 21. An identical dog-leg bend 68 is provided in the opposite wall 17, so that channel member 15 can be used with either of its walls turned to the outside of window 14. Heel portions 69 and 70 of seal 10 wrap around the bottom edges 71 and 72, respectively, of casing 11.

Clip 22, made of spring steel, is wedged inside channel member 15. Outside wall 23 of clip 22 turns outward and upward at the bottom, clamping the top edge 24 of rain shield 25 between it and upturned foot 13. A pair of barb members 26 and 27 project outwardly from outside wall 23 of clip 22. Both barb members 26 and 27 hook over interior ledge section 18 of channel member 15. A single barb member 28 projects outwardly from inside wall 73 of clip 22. Barb member 28 hooks on ledge section 20 of inside wall 17. Ledges 18 and 20 and barb members 26 and 28 cooperate to prevent clip 22 from falling out of window casing 11.

Figure 3A:
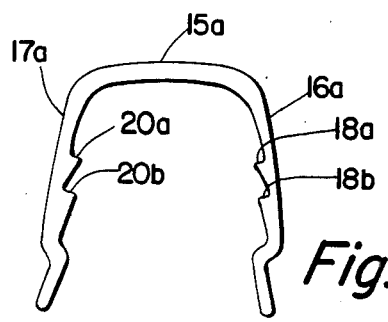
FIG. 3a is an end view of an alternative form of the channel member shown in FIG. 3.

In FIG. 3a is shown an alternative version of the channel member that can be used on the Chevy S-10 window. Channel member 15a has two parallel, longitudinal ledges 18a and 18b in the interior surface of its outside wall 16a; similarly, it has two ledges 20a and 20b on its inside wall 17a. This design is more forgiving of out-of-tolerance parts. If the companion clip is too big to hook on ledges 18a and 20a, it can be dropped a notch lower to hook on ledges 18b and 20b.

Referring to FIGS. 5 and 8, retainer clip 29 is wedged inside the vertical section of window casing 11. The bottom of the inside wall 30 of clip 29 is tucked behind upturned foot 12 of seal 10. The outside wall 31 of clip 29 turns outwardly and upwardly at its bottom, thereby clamping sideedge 32 of rain shield 25 between wall 31 and upturned foot 13. No channel member is needed in the side, or vertical, section of window casing 11 because clip 29 does not support the full weight of the rain shield 25. It primarily holds the shield aside to allow window 14 to clear when it is raised.

Figure 1:
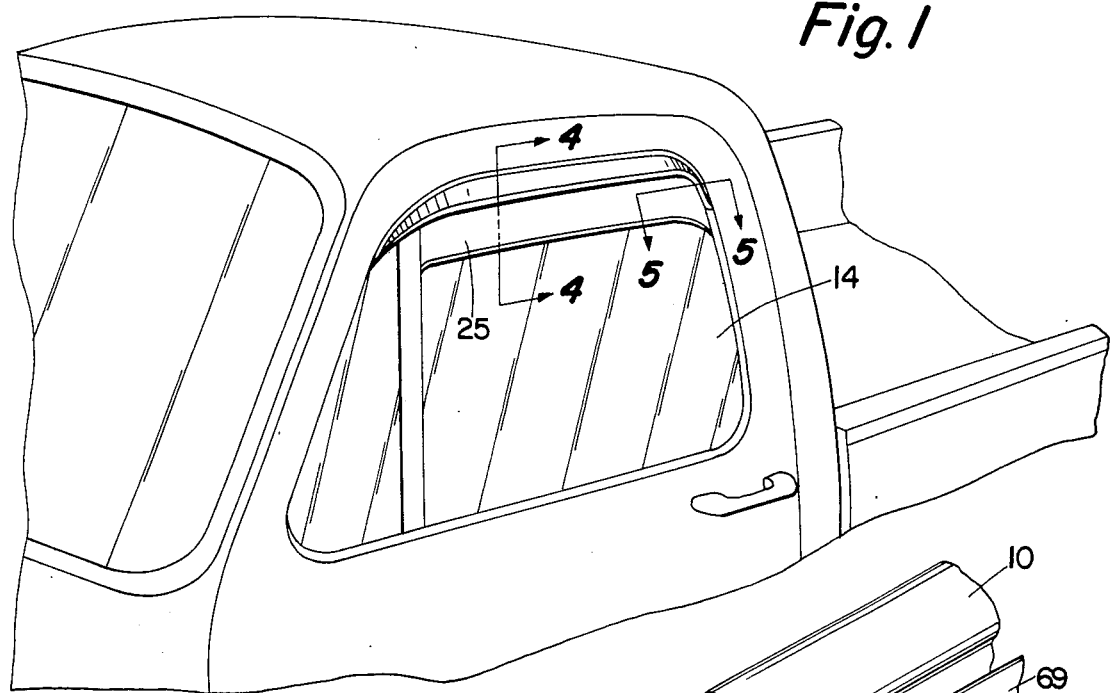
Figure 3:
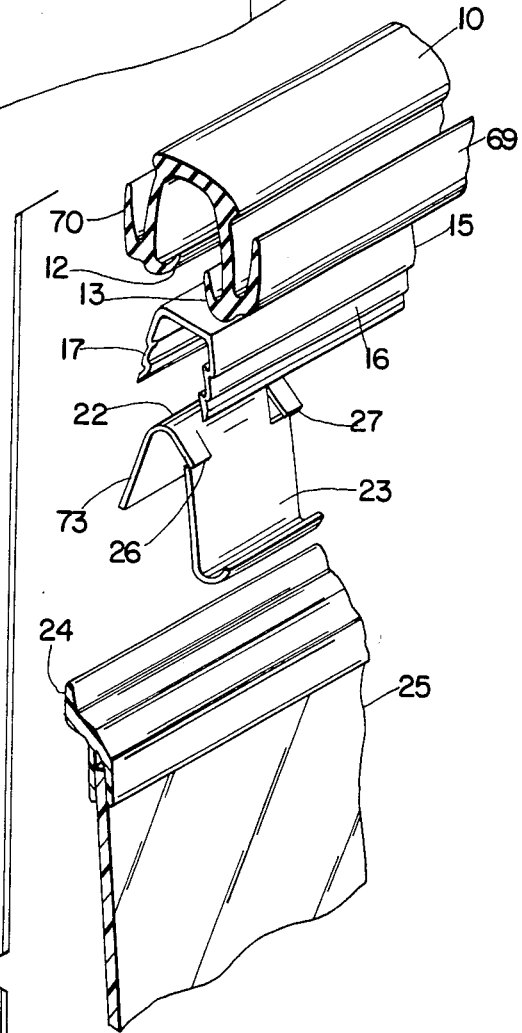
FIG. 3 is a fragmentary exploded perspective view of an embodiment of the invention that can be used on a Chevrolet S-10 pickup truck (model years 82–86). It shows the relationship of the resilient seal, the channel member, the clip, and the top edge of the rain shield.
Figure 2:
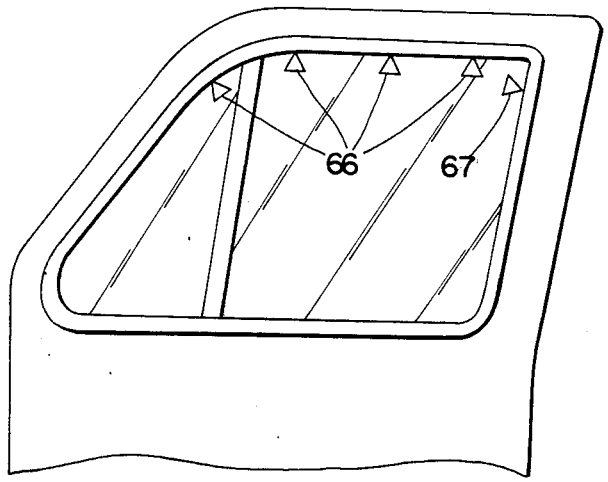
FIG. 2 is a schematic side view of an automobile door, showing the location of five sets of retaining means for holding a rain shield in place.

Referring to FIG. 2, triangles 66 point to four locations in the upper window casing of a Chevrolet S-10 pickup truck where the retainer means illustrated in FIGS. 3, 4, 6, and 7 may advantageously be installed. Triangle 67 points to a side location in the casing where the retainer clip illustrated in FIGS. 5 and 8 can be used.

Figure 9:
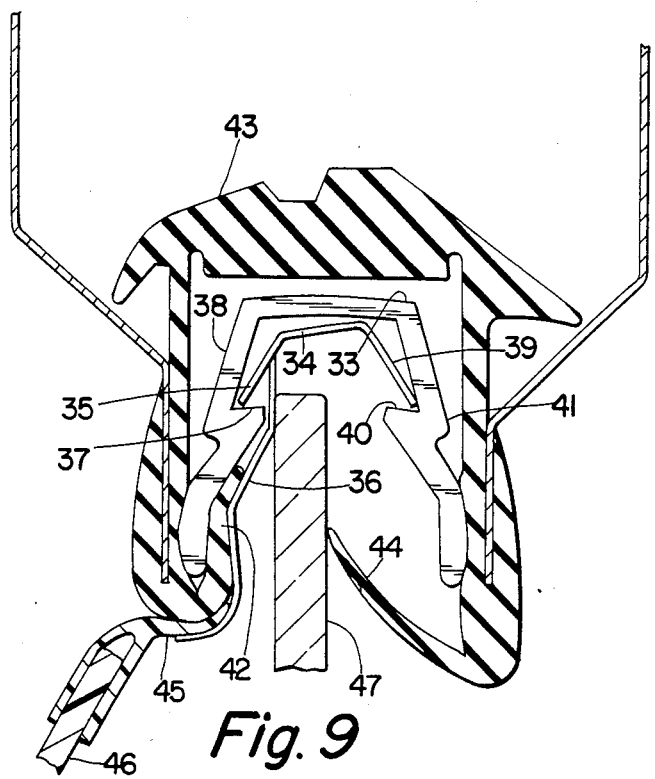
FIG. 9 is an end view of a second embodiment of the invention, designed for use in the window of a Dodge or Plymouth Mini-Van for the model years '84 through '86.

In the embodiment illustrated in FIG. 9, for use on a Dodge or Plymouth Mini Van, all of the parts are shown pressed against one another, as they are in actual use. In this embodiment, plastic channel member 33 has a single longitudinal ledge in each wall. Clip 34 has a barb member 35 projecting outwardly from its outside wall 36. Barb member 35 hooks on ledge 37 of the outside wall 38 of channel member 33. Inside wall 39 of clip 34 is short. Its bottom hooks on ledge 40 of inside wall 41 of channel member 33. The bottom edge of outside wall 38 of channel member 33 is tucked behind upturned foot 42 of rubber seal 43. The bottom edge of inside wall 41 of channel member 33 is tucked behind upturned foot 44 of seal 43. The bottom edge of outside wall 36 of clip 34 turns outwardly and upwardly, gripping the top edge 45 of rain shield 46 between the clip and upturned foot 42. Upturned feet 42 and 44 seal against window 47 when it is closed, except where the seal is interrupted by the presence of clip 33.

Figure 10:
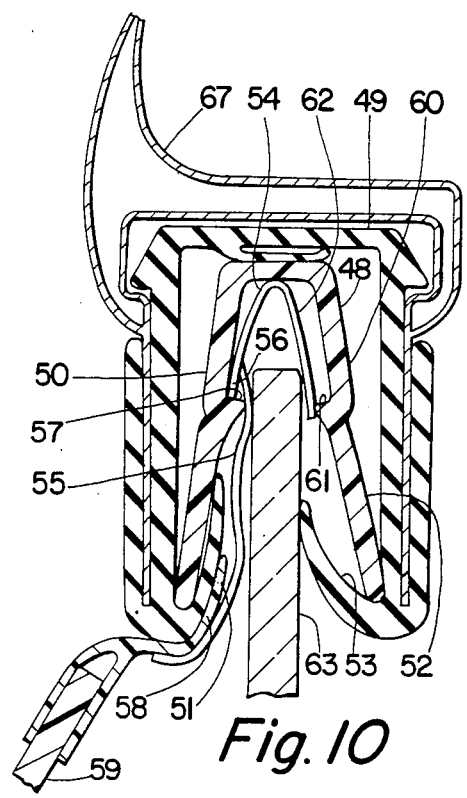
FIG. 10 is an end view of a third embodiment of the invention, designed for use in the window of a GMC Astro Van for the model years '85 and '86.

FIG. 10 illustrates an arrangement similar to that shown in FIG. 9, but for use on a GMC Astro Van. In this embodiment only one ledge section is used—that on the outside wall of the channel member.

Rubber seal 49 is pressure fitted inside window casing 64. Plastic channel member 48 is wedged inside rubber seal 49. The bottom edge of outside wall 50 of channel member 48 is tucked behind upturned foot 51 of seal 49. The bottom edge of inside wall 52 of channel member 48 is tucked behind upturned foot 53. Clip 54, which is made of spring steel, is wedged inside channel member 48. When window 63 is closed, feet 51 and 53 seat against it, except in the locations where the outside wall 55 of clip 54 is interposed between window 63 and foot 51.

Outside wall 55 of clip 54 has an outwardly protruding barb member 56. Barb member 56 hooks on longitudinal ledge section 57 on the interior surface of outside wall 50 of channel member 48. The bottom edge of outside wall 55 of clip 54 turns outward and upward, so as to clamp the top edge 58 of rain shield 59 between clip wall 55 and upturned foot 51. Inside wall 52 also is provided with a longitudinal ledge 61. Wall 62 presses sideways against ledge 61 and does not rest upon it. This causes outside clip wall 55 to exert greater pressure against rain shield edge 58 than if wall 62 were shorter and rested on top of ledge 61. This embodiment has been found to be preferred where the window casing is relatively narrow, as shown in FIG. 10. The support provided by outside ledge 57 and barb member 56 still will be sufficient to prevent clip 54 from falling out of the window casing.

Figure 11:
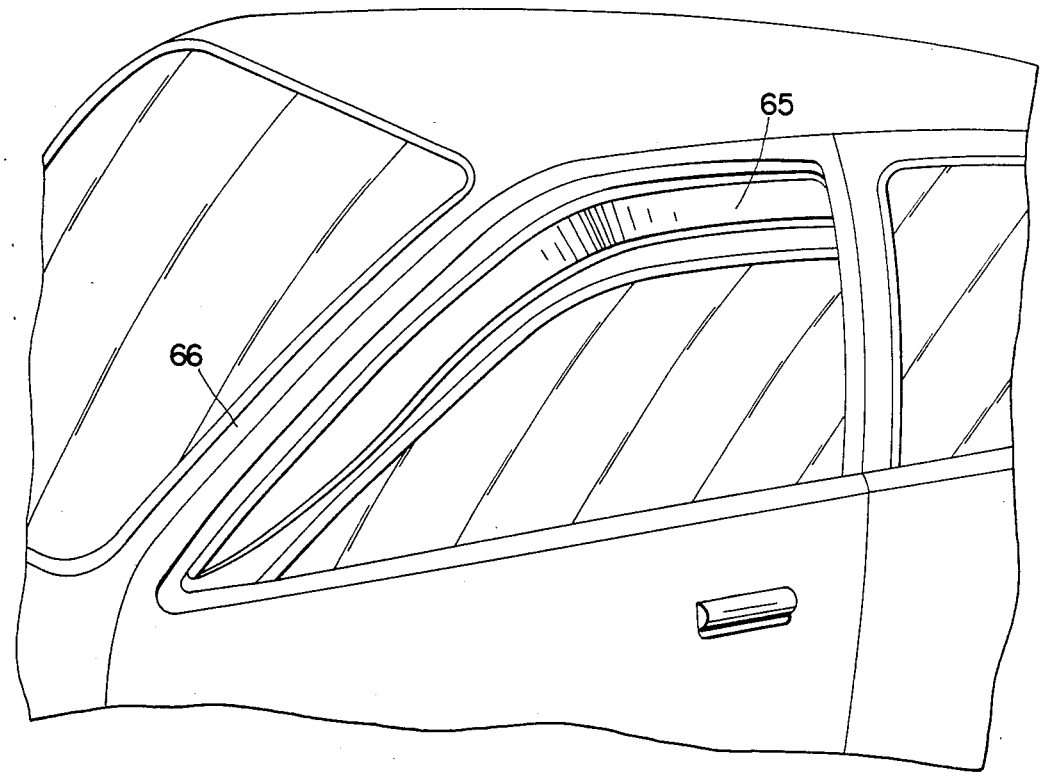
FIG. 11 is an environmental perspective view of a second style of rain shield, for use on passenger cars, that also can be held in place by the retainer means of the present invention.

As shown in FIG. 2, it will usually suffice to have about five retainer clip assemblies to hold the rain shield in a window. The rain shield 65 shown in FIG. 11, however, may require more of the retainer clip assemblies, since it extends practically to the bottom of the A pillar 66 of the automobile.

We claim:

1. Retainer means for holding the top edge of a removable rain shield in the upper horizontal casing of an automobile window, wherein the casing is lined with a resilient seal which, in cross-section, is substantially shaped like an inverted U with inwardly upturned, flexible feet that seal against the opposite sides of the window glass when the window is closed, said means comprising the combination of
   (a) a length of substantially U-shaped channel member having a ceiling, an inside wall ending in a bottom edge, and an opposite, outside wall also ending in a bottom edge; said channel member being of a size to be insertable, ceiling-first, in said casing, so that the channel member's bottom edges are tucked behind the respective upturned feet of the seal, thereby holding the channel member from falling out of the window casing; the outside wall of the channel member having at least one longitudinal ledge section on its interior surface; and
   (b) a substantially U-shaped clip having a ceiling, an inside wall ending in a bottom edge, and an opposite, outside wall also ending in a bottom edge; said clip being of a size to be insertable, ceiling-first, in said channel member; the bottom edge of the clip's outside wall being bent outwardly and upwardly so as to be capable of gripping the top edge of the rain shield between said outside wall and the adjacent upturned foot of the resilient seal; said clip's outside wall having an outwardly projecting barb member adapted to hook over the interior ledge section on the channel member's outside wall, thereby preventing the clip from falling out of the window casing.

2. The retainer means of claim 1 wherein the clip, when in its relaxed position, is wider from wall to wall than the inside width of the channel member, so that the clip is partially compressed when inserted in the channel, thereby causing the clip's outside wall to exert a clamping pressure against the top edge of the rain shield.

3. The retainer means of claim 2 wherein said channel member's inside wall also has a longitudinal ledge section on its interior surface, and said clip's inside wall also has an outwardly projecting barb member, said barb member being adapted to hook over the interior ledge section on the channel member's inside wall, thereby aiding in preventing the clip from falling out of the window casing.

4. The retainer means of claim 2 wherein at least one of the walls of the channel member has at least two longitudinal ledge sections on its interior surface, said ledge sections being parallel and spaced apart.

5. The retainer means of claim 2 wherein the channel member is made of extruded plastic.

6. The retainer means of claim 4 wherein the clip is made of spring steel.

7. The retainer means of claim 2 wherein the channel member is made of extruded plastic and the clip is made of spring steel.

8. Retainer means for holding the top edge of a removable rain shield in the upper horizontal casing of an automobile window, wherein the casing is lined with a resilient seal which, in cross-section, is substantially shaped like an inverted U with inwardly upturned, flexible feet that seal against the opposite sides of the window glass when the window is closed, said means comprising the combination of
   (a) a length of substantially U-shaped channel member having a ceiling, an inside wall ending in a bottom edge, and an opposite, outside wall also ending in a bottom edge; said channel member being of a size to be insertable, ceiling-first, in said casing, so that the channel member's bottom edges are tucked behind the respective upturned feet of the seal, thereby holding the channel member from falling out of the window casing; each wall of the channel member having at least one longitudinal ledge section on its interior surface; and
   (b) a substantially U-shaped clip having a ceiling, an inside wall ending in a bottom edge, and an opposite, outside wall also ending in a bottom edge; said clip being of a size to be insertable, ceiling-first, in said channel member; the bottom edge of the clip's outside wall being bent outwardly and upwardly so as to be capable of gripping the top edge of the rain shield between said outside wall and the adjacent upturned foot of the resilient seal; said clip's outside wall having an outwardly projecting barb member adapted to hook over the interior ledge section on the channel member's outside wall; the bottom edge of said clip's inside wall being adapted to hook over the interior ledge section on the channel member's inside wall; said barb member, clip's inside wall, and ledge sections thereby cooperating to prevent the clip from falling out of the window casing.

9. The retainer means of claim 8 wherein the clip, when in its relaxed position, is wider from wall to wall than the inside width of the channel member, so that the clip is partially compressed when inserted in the channel, thereby causing the clip's outside wall to exert a clamping pressure against the top edge of the rain shield.

10. The retainer means of claim 9 wherein at least one of the walls of the channel member has at least two longitudinal ledge sections on its interior surface, said ledge sections being parallel and spaced apart.

11. The retainer means of claim 10 wherein the channel member is made of extruded plastic.

12. The retainer means of claim 11 wherein the clip is made of spring steel.

13. The retainer means of claim 12 wherein the clip is made of extruded plastic and the clip is made of metal.

14. A rain shield assembly for attachment to the upper horizontal casing of an automobile window, wherein the casing is lined with a resilient seal which, in cross-section, is substantially shaped like an inverted U with inwardly upturned, flexible feet that seal against the opposite sides of the window glass when the window is closed, said assembly comprising the combination of
   (a) a rain shield having a top edge that is thin enough to fit inside the window's upper horizontal casing when the window is closed, the shield serving to overhang the space above the window glass when the window is partially open, thereby deflecting rain from entering the space, (b) a length of substantially U-shaped channel member having a ceiling, an inside wall ending in a bottom edge, and an opposite, outside wall also ending in a bottom edge; said channel member being of a size to be insertable, ceiling-first, in said casing, so that the channel member's bottom edges are tucked behind the respective upturned feet of the seal, thereby holding the channel member from falling out of the window casing; the outside wall of the channel member having at least one longitudinal ledge section on its interior surface; and (c) a substantially U-shaped clip having a ceiling, an inside wall ending in a bottom edge, and an opposite, outside wall also ending in a bottom edge; said clip being of a size to be insertable, ceiling-first, in said channel member; the bottom edge of the clip's outside wall being bent outwardly and upwardly so as to be capable of gripping the top edge of the rain shield between said outside wall and the adjacent upturned foot of the resilient seal; said clip's outside wall having an outwardly projecting barb member adapted to hook over the interior ledge section on the channel member's outside wall, thereby preventing the clip from falling out of the window casing.

15. The retainer means of claim 14 wherein the clip, when in its relaxed position, is wider from wall to wall than the inside width of the channel member, so that the clip is partially compressed when inserted in the channel, thereby causing the clip's outside wall to exert a clamping pressure against the top edge of the rain shield.

16. The rain shield assembly of claim 15 wherein said channel member's inside wall also has a longitudinal ledge section on its interior surface, and said clip's inside wall also has an outwardly projecting barb member, said barb member being adapted to hook over the interior ledge section on the channel member's inside wall, thereby aiding in preventing the clip from falling out of the window casing.

17. The rain shield assembly of claim 16 wherein at least one of the walls of the channel member has at least two longitudinal ledge sections on its interior surface, said ledge sections being parallel and spaced apart.

18. The rain shield assembly of claim 16 wherein the channel member is made of extruded plastic.

19. The rain shield assembly of claim 18 wherein the clip is made of spring steel.

20. The rain shield assembly of claim 17 wherein the channel member is made of extruded plastic and the clip is made of spring steel.

21. A rain shield assembly for attachment to the upper horizontal casing of an automobile window, wherein the casing is lined with a resilient seal which, in cross-section, is substantially shaped like an inverted U with inwardly upturned, flexible feet that seal against the opposite sides of the window glass when the window is closed, said assembly comprising the combination of (a) a rain shield having a top edge that is thin enough to fit inside the window's upper horizontal casing when the window is closed, the shield serving to overhang the space above the window glass when the window is partially open, thereby deflecting rain from entering the space, (b) a length of substantially U-shaped channel member having a ceiling, an inside wall ending in a bottom edge, and an opposite, outside wall also ending in a bottom edge; said channel member being of a size to be insertable, ceiling-first, in said casing, so that the channel member's bottom edges are tucked behind the respective upturned feet of the seal, thereby holding the channel member from falling out of the window casing; each wall of the channel member having at least one longitudinal ledge section on its interior surface; and (c) a substantially U-shaped clip having a ceiling, an inside wall ending in a bottom edge, and an opposite, outside wall also ending in a bottom edge; said clip being of a size to be insertable, ceiling-first, in said channel member; the bottom edge of the clip's outside wall being bent outwardly and upwardly so as to be capable of gripping the top edge of the rain shield between said outside wall and the adjacent upturned foot of the resilient seal; said clip's outside wall having an outwardly projecting barb member adapted to hook over the interior ledge section on the channel member's outside wall; the bottom edge of said clip's inside wall being adapted to hook over the interior ledge section on the channel member's inside wall; said barb member, clip's inside wall, and ledge sections thereby cooperating to prevent the clip from falling out of the window casing.

22. The retainer means of claim 21 wherein the clip, when in its relaxed position, is wider from wall to wall than the inside width of the channel member, so that the clip is partially compressed when inserted in the channel, thereby causing the clip's outside wall to exert a clamping pressure against the top edge of the rain shield.

23. The rain shield assembly of claim 22 wherein at least one of the walls of the member has at least two longitudinal ledge sections on its interior surface, said ledge sections being parallel and spaced apart.

24. The rain shield assembly of claim 22 wherein the channel member is made of extruded plastic.

25. The rain shield assembly of claim 24 wherein the clip is made of spring steel.

26. The rain shield assembly of claim 23 wherein the channel member is made of extruded plastic and the clip is made of spring steel.

* * * * *